May 13, 1924.

W. A. COOK

CLUTCH

Filed July 30, 1921

W. A. Cook, Inventor

By C. A. Snow & Co.

Attorney

May 13, 1924.
W. A. COOK
CLUTCH
Filed July 30, 1921        2 Sheets—Sheet 2
1,493,607
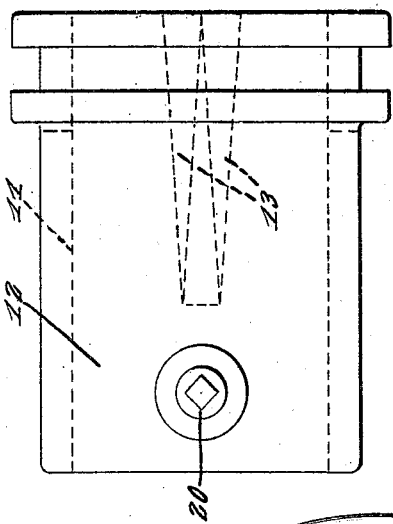
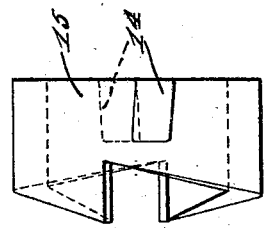
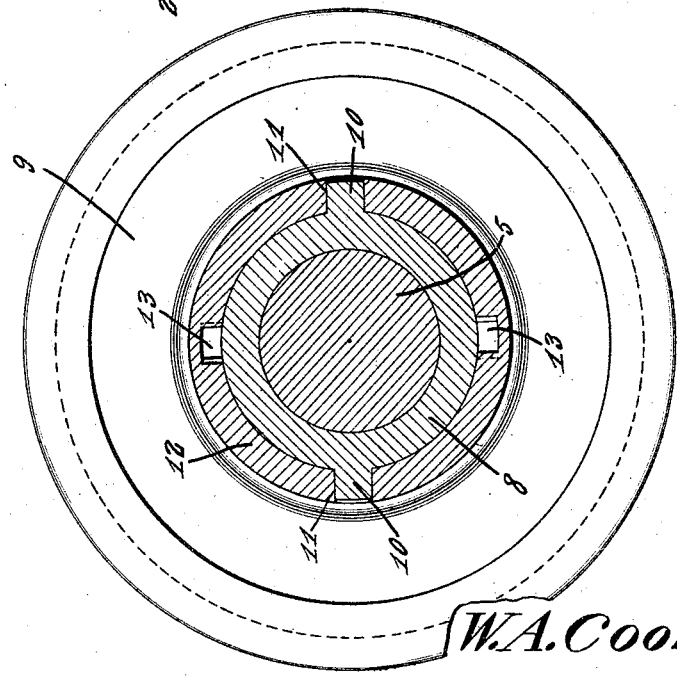
W. A. Cook, Inventor
By C. A. Snow & Co.
Attorney Patented May 13, 1924.

1,493,607

UNITED STATES PATENT OFFICE.

WILLIAM ARTHUR COOK, OF MARION, INDIANA, ASSIGNOR TO MARION MACHINE, FOUNDRY AND SUPPLY COMPANY, OF MARION, INDIANA.

CLUTCH.

Application filed July 30, 1921. Serial No. 488,534.

*To all whom it may concern:*

Be it known that I, WILLIAM A. COOK, a citizen of the United States, residing at Marion, in the county of Grant and State of Indiana, have invented a new and useful Clutch, of which the following is a specification.

This invention relates to clutch operating mechanisms, the primary object of the invention being to provide means to move the movable clutch member with respect to the opposed clutch member to insure a positive operation of the clutch members.

A further object of the invention is the provision of means for locking the operating sleeve in a predetermined position to insure against the sleeve accidentally moving the clutch members into clutched engagement.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 2 is a sectional view taken on line 2—2 of Figure 1.

Figure 3 is a side elevational view of the operating sleeve.

Figure 4 is an elevational view of the sleeve locking member.

Figure 1:
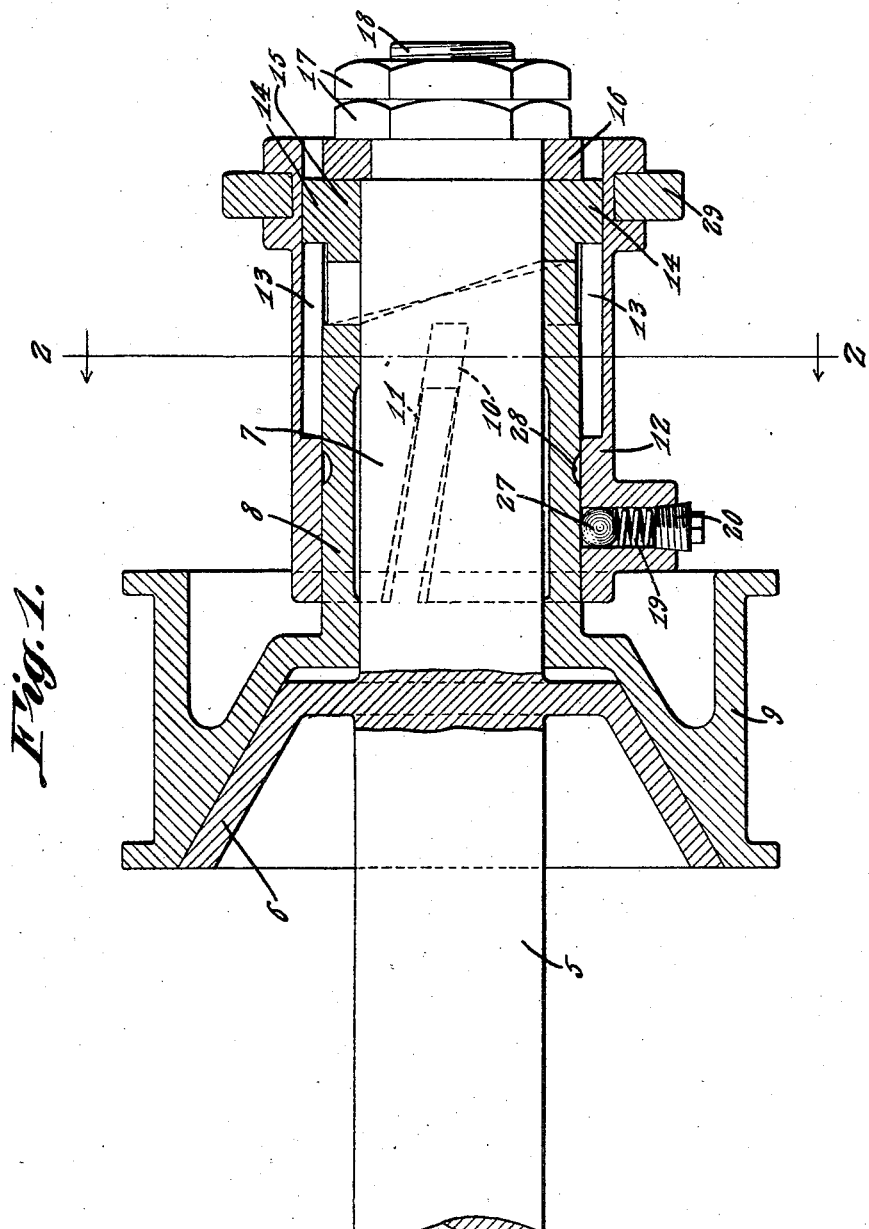
Figure 1 is a fragmental sectional view of a clutch and operating mechanism constructed in accordance with the present invention.

Referring to the drawing in detail, the reference character 5 designates the drive shaft, which may be of the usual construction and provided with the friction clutch member 6, the shaft being provided with an extension 7 to accommodate the sleeve 8 formed integral with the movable clutch element 9.

This sleeve 8 is provided with the lateral lugs 10 which move in the angularly disposed cut out portions 11 formed in the operating sleeve 12 which moves the sleeve 8, and as shown this sleeve 12 is provided with grooves 13 inclined towards one end of the sleeve which inclined grooves accommodate the lugs 14 formed on the sleeve locking member 15, that is disposed adjacent to the outer end of the drive shaft 5 so that movement of the member 12 longitudinally of the shaft will produce a slight rotary movement of the sleeve whereupon the clutch element 9 is forced into engagement with the clutch member 6 causing the clutch member 9 to rotate with the clutch member 6 and its shaft.

Disposed at one end of the drive shaft is a washer 16 that abuts the locking member 15 which is supported adjacent to the outer end of the shaft 5, nuts 17 being provided on the threaded extension 18 of the drive shaft for securing the member 15 against movement, with respect to the shaft.

Formed in the operating sleeve 12 adjacent the inner end thereof, is an opening designed to receive the coiled spring 19 which is held within the opening by means of the plug 20 which engages one end of the spring, the opposite end of the spring providing a seat for the ball 27. The ball 27 contacts with one wall of the sleeve 8 and moves to a position contacting with the wall of the depressed portion 28 where the sleeve 12 is locked to the sleeve 8, and prevented from moving with respect thereto, under normal conditions.

From the foregoing it will be obvious that due to this construction, the clutch members will be held in engagement to accomplish the purpose of the invention and when the member 29 is moved longitudinally of the shaft, the sleeve 12 will be slightly rotated and the ball 27 will enter the depression 28, the sleeve 8 moving to disengage the clutch members. When it is desired to move the clutch members into engagement, the sleeve 12 is moved in the opposite direction with sufficient pressure to overcome the tension of the coiled spring 19 to cause the ball 27 to move out of the depression 28.

As shown the outer end of the sleeve 8 is inclined, the inclined walls cooperating with the inclined walls of the locking member 15 so that when the member 12 is moved, the inclined surfaces will engage to cause a positive operation of the movable clutch element.

It is to be understood however, that a suitable space is provided between the inclined surfaces, so that a movement between the member 15 and movable clutch member is permitted.

The operating sleeve 12 is provided with a circumferential groove adapted to accommodate the operating member 29 which may be moved to reciprocate the sleeve 12 to accomplish the moving of the movable clutch member.

Thus it will be seen that should it be desired to move the clutch member 9 into engagement with the clutch member 6, the operating member is moved inwardly, which results in a movement of the sleeve 12, member 15 and sleeve 8 as previously described. During this movement of the sleeve 12, the lugs 14 move in the inclined grooves 13, causing a slight rotation of the locking member 15, whereupon the inclined surfaces at the ends of the member 15 and sleeve 8 are brought into close engagement with each other, to the end that the sleeve 8 moves towards the member 6 imparting a slight rotary movement thereto, due to the lugs 10 moving in the angularly disposed cut out portions 11, to the end that the member 9 is moved into close engagement with the clutch member 6 to receive motion therefrom.

Having thus described the invention, what is claimed as new is:—

1. In a device of the character described, a shaft having a clutch member secured thereto, a movable sleeve member loosely mounted on the shaft, lugs extending laterally from the sleeve member, said sleeve member carrying a clutch element adapted to cooperate with the first mentioned clutch member, said sleeve member having inclined end walls, a locking member mounted on one end of the shaft having inclined walls cooperating with the inclined walls of the sleeve member, said locking member having laterally extending lugs, an operating sleeve having angularly disposed grooves to accommodate the lugs of the locking member the operating sleeve having angularly disposed cut out portions to receive the lugs of the movable sleeve member, means for operating the movable sleeve member, and means for normally locking the movable sleeve member and the operating sleeve against relative axial movement.

2. In a device of the character described, a shaft having a clutch member secured thereto, a movable sleeve member carrying a pulley having its inner surface inclined to form a clutch member, a locking member at one end of the shaft, said locking member and movable sleeve member having inclined ends, an operating sleeve mounted on the locking member and movable sleeve member, and means for connecting the operating sleeve and locking member and movable sleeve member, whereby movement of the operating sleeve longitudinally of the shaft produces a rotary movement of the movable sleeve member, and means for normally locking the movable sleeve member and the operating sleeve against relative axial movement.

In testimony that I claim the foregoing as my own, I have hereto affixed my signature in the presence of two witnesses.

WILLIAM ARTHUR COOK.

Witnesses:
 GEO. L. SHARP,
 J. A. BOND.